US012341926B2

(12) United States Patent
Varada et al.

(10) Patent No.: US 12,341,926 B2
(45) Date of Patent: Jun. 24, 2025

(54) SELECTIVE RECORDING OF MULTIUSER CALLS

(71) Applicant: QUALCOMM Incorporated, San Diego, CA (US)

(72) Inventors: Sairam Varada, Polavaram (IN); Reddy Vijay Gudi, Hyderabad (IN); Manish Garg, Hyderabad (IN); Shiva Kumar Mangali, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 18/058,229

(22) Filed: Nov. 22, 2022

(65) Prior Publication Data
US 2024/0171676 A1 May 23, 2024

(51) Int. Cl.
*H04M 3/42* (2006.01)
*H04W 4/16* (2009.01)

(52) U.S. Cl.
CPC ......... *H04M 3/42221* (2013.01); *H04W 4/16* (2013.01)

(58) Field of Classification Search
CPC ............................ H04M 3/42221; H04W 4/16
USPC ......................................................... 379/68
See application file for complete search history.

(56) References Cited

U.S. PATENT DOCUMENTS

| | | | | |
|---|---|---|---|---|
| 5,619,555 | A * | 4/1997 | Fenton | H04M 3/563 379/202.01 |
| 11,974,074 | B2 * | 4/2024 | Springer | H04L 12/1822 |
| 2010/0226482 | A1 * | 9/2010 | Naparstek | H04M 3/42221 379/265.09 |
| 2012/0213339 | A1 * | 8/2012 | Oliver | H04M 3/42221 379/202.01 |
| 2014/0044047 | A1 * | 2/2014 | Enoch | H04L 63/30 370/328 |
| 2022/0174148 | A1 * | 6/2022 | Maki | H04M 3/56 |
| 2024/0205335 | A1 * | 6/2024 | Ramsay | H04M 3/42221 |

FOREIGN PATENT DOCUMENTS

CN  103475835 A  12/2013

OTHER PUBLICATIONS

International Search Report and Written Opinion—PCT/US2023/078612—ISA/EPO—Mar. 6, 2024.
International Search Report and Written Opinion—PCT/US2023/078612—ISA/EPO—Jun. 19, 2024.

* cited by examiner

*Primary Examiner* — Binh Kien Tieu
(74) *Attorney, Agent, or Firm* — QUALCOMM Incorporated; Espartaco Diaz Hidalgo

(57) ABSTRACT

Disclosed are systems and techniques for multiuser communications. For instance, a process can include establishing a multiuser call, the multiuser call including at least two other network devices. The process can further include receiving a request to record the multiuser call, receiving an indication to disable recording for a second network device, and causing recording of data from the second network device on the multiuser call to be disabled.

30 Claims, 10 Drawing Sheets

SELECTIVE RECORDING OF MULTIUSER CALLS

FIELD

The present disclosure generally relates to multiuser communications. For example, aspects of the present disclosure relate to systems and techniques for a selectively recording certain users of a multiuser call.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Although communication systems have made great technological advancements over many years, challenges still exist. For example, multiuser calls (e.g., conference calls, or calls between at least three user devices) are an increasingly common feature. In some cases, users would like to record these multiuser calls. However, recording multiuser calls (e.g., conference calls) can be challenging due to data sizes increase dramatically as a number of users on a multiuser call increases. Consequently, an ability of a communication system to handle multiuser call recording should be enhanced.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing a multiuser call. In one illustrative example, a first network device for multiuser communications is provided. The first network device comprises at least one memory comprising instructions and at least one processor coupled to the at least one memory. The at least one processor is configured to: establish a multiuser call, the multiuser call including at least two other network devices; receive a request to record the multiuser call; receive an indication to disable recording for a second network device; and cause recording of data from the second network device on the multiuser call to be disabled.

As another example, a method for multiuser communications is provided. The method includes: establishing a multiuser call, the multiuser call including at least two other network devices; receiving a request to record the multiuser call; receiving an indication to disable recording for a second network device; and causing recording of data from the second network device on the multiuser call to be disabled.

In another example, a non-transitory computer-readable medium having stored thereon instructions is provided. The non-transitory computer-readable medium having stored thereon instructions, when executed by at least one processor, cause the at least one processor to: establish a multiuser call, the multiuser call including at least two other network devices; receive a request to record the multiuser call; receive an indication to disable recording for a second network device; and cause recording of data from the second network device on the multiuser call to be disabled.

As another example, a first network device for multiuser communications is provided. The first network device includes: means for establishing a multiuser call, the multiuser call including at least two other network devices; means for receiving a request to record the multiuser call; receiving an indication to disable recording for a second network device; and means for causing recording of data from the second network device on the multiuser call to be disabled.

In some aspects, one or more of the apparatuses described herein can include, can be, or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, the system includes at least one camera for capturing one or more images or video frames. For example, the system can include a camera (e.g., an RGB camera) or multiple cameras for capturing one or more images and/or one or more videos including video frames. In some aspects, the system includes a display for displaying one or more images, videos, notifications, or other displayable data. In some aspects, the system includes a transmitter configured to transmit one or more video frame and/or syntax data over a transmission medium to at least one device. In some aspects, the system described above can include one or more sensors. In some aspects, the processor includes a neural processing unit (NPU), a central processing unit (CPU), a graphics processing unit (GPU), and/or other processing device or component.

The foregoing, together with other features and examples, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Figure 1:
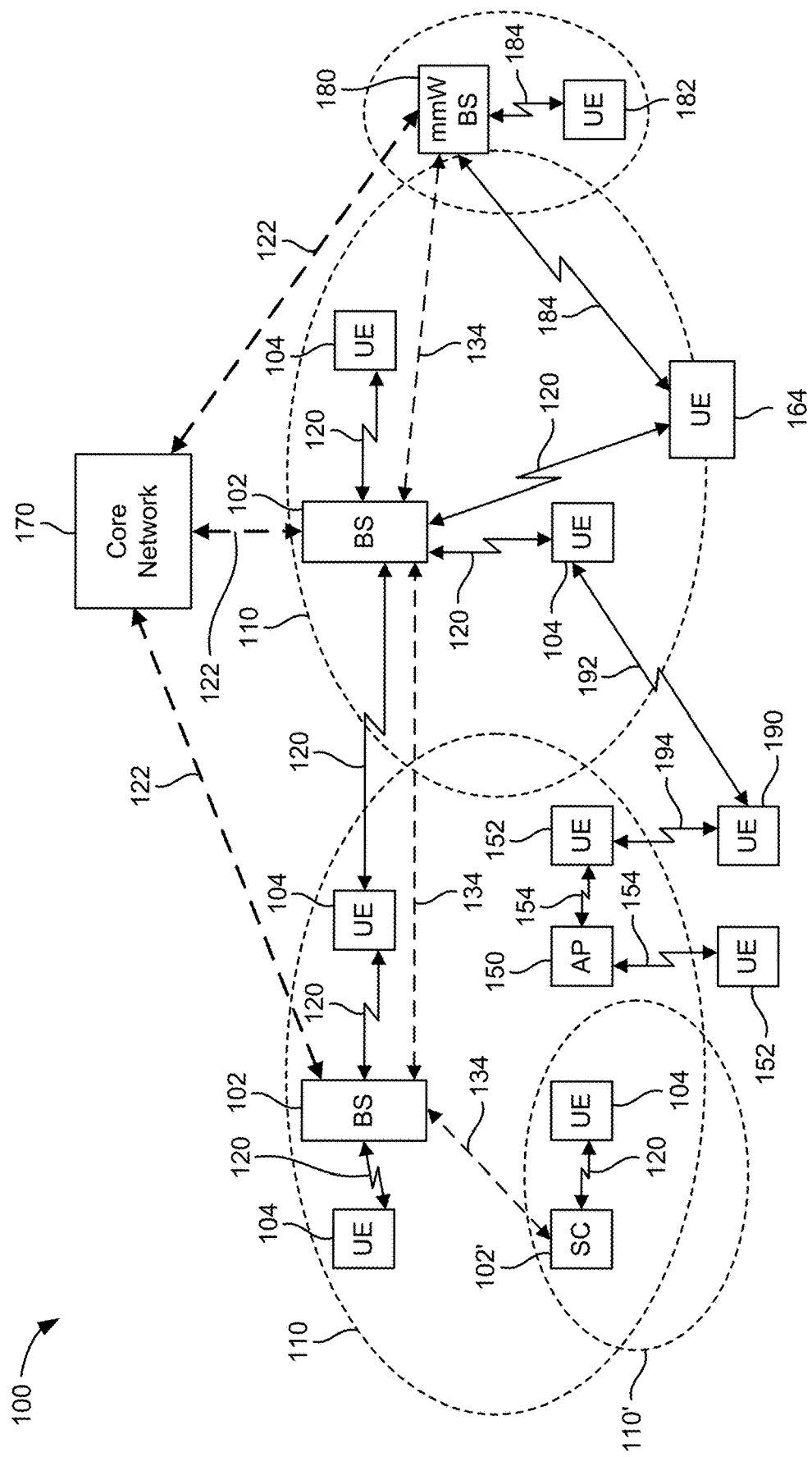
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As noted above, systems and techniques are described herein for multiuser communications (e.g., multiuser calls or conference calls among three or more user devices). In some cases, users would like to record multiuser calls. However, recording multiuser calls (e.g., conference calls) can be challenging as data sizes can increase dramatically as a number of users on a multiuser call increases. Additionally, there may be a desire not to record certain users as a part of the multiuser call, based on a preference or desire of the users.

The systems and techniques described herein can selectively disable recording for some users from the recording of the multiuser call. For example, while users are participating in (e.g., conducting) a multiuser call, recording of the multiuser call may be triggered, for example, based on a request to record the multiuser call. In some cases, a list of user devices joined to (e.g., participating in) the multiuser call may be generated. This list of user devices may be presented, for example, to a user in a user interface (UI). The user may then be able to select user devices to disable (or enable) recording for the recording of the multiuser call. Recording of such a selected device may then be disabled (or enabled). The selected device may still participate in the multiuser call as normal, but audio and/or video data from the selected device may not be included in the recording of the multiuser call. Other participating user devices may still be included in the recording of the multiuser call.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a gNB for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) MC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (MC), or a Non-Real Time (Non-RT) MC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location 102 which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed sub scriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
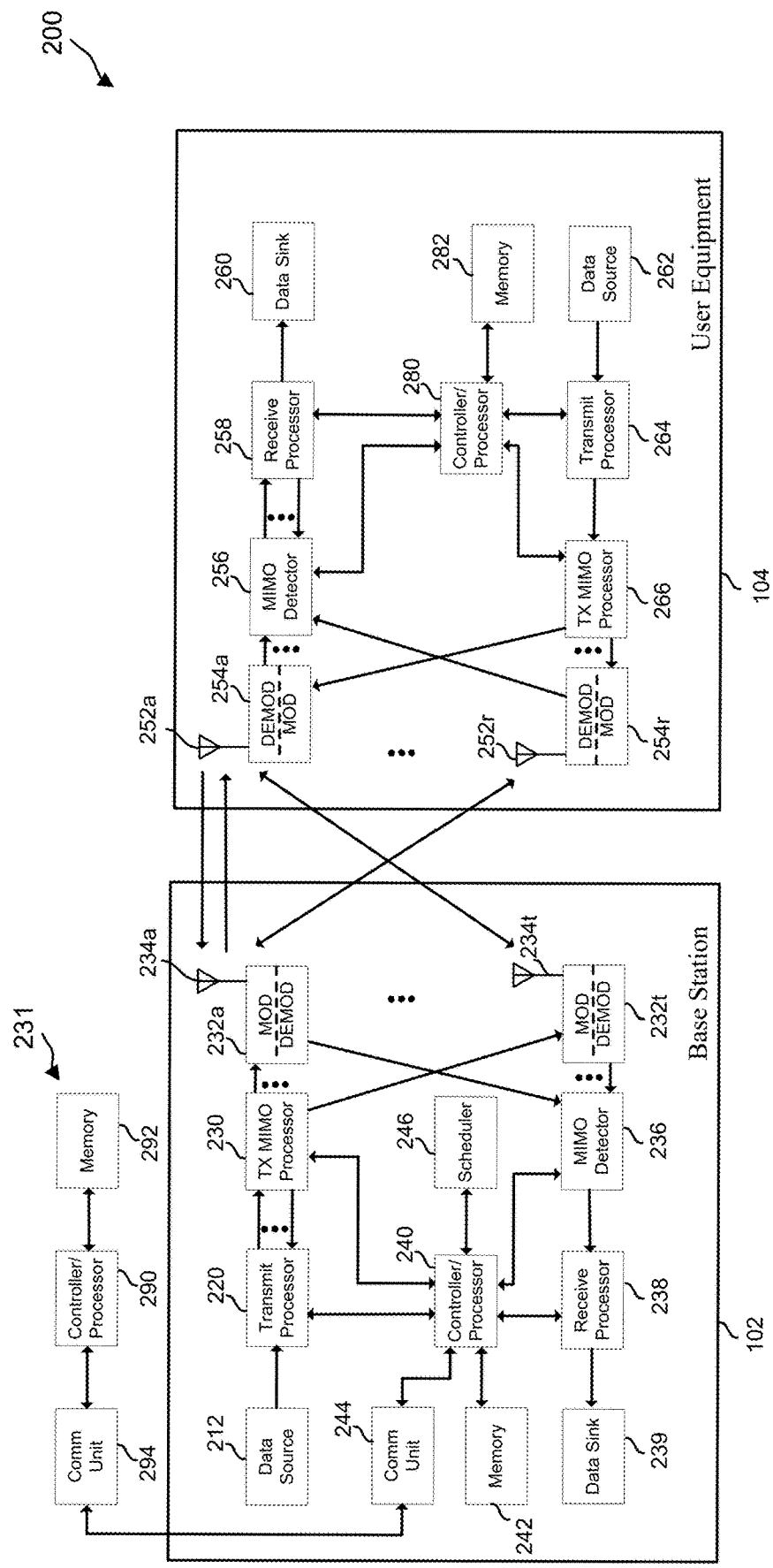
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
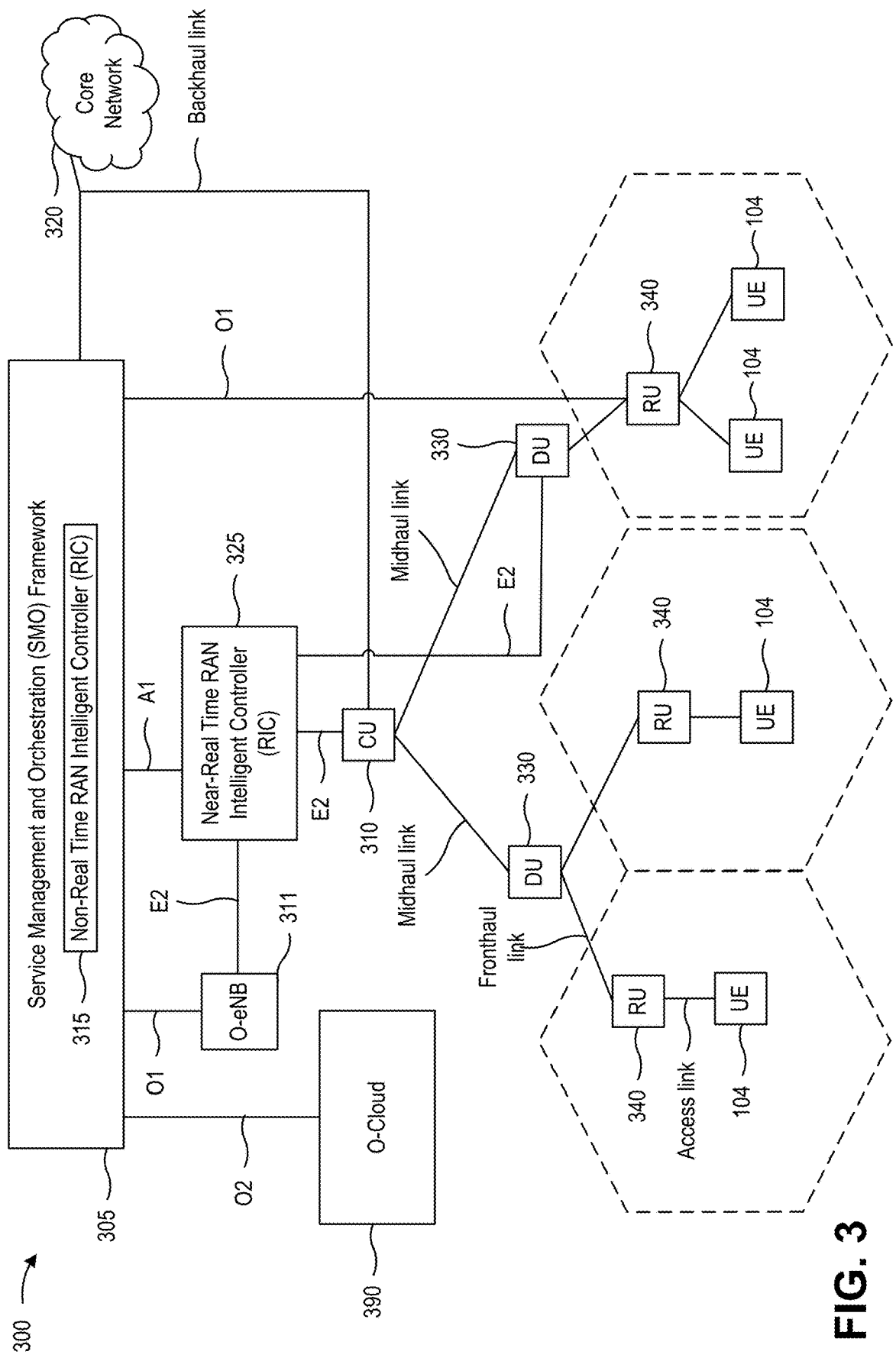
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUs 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT MC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
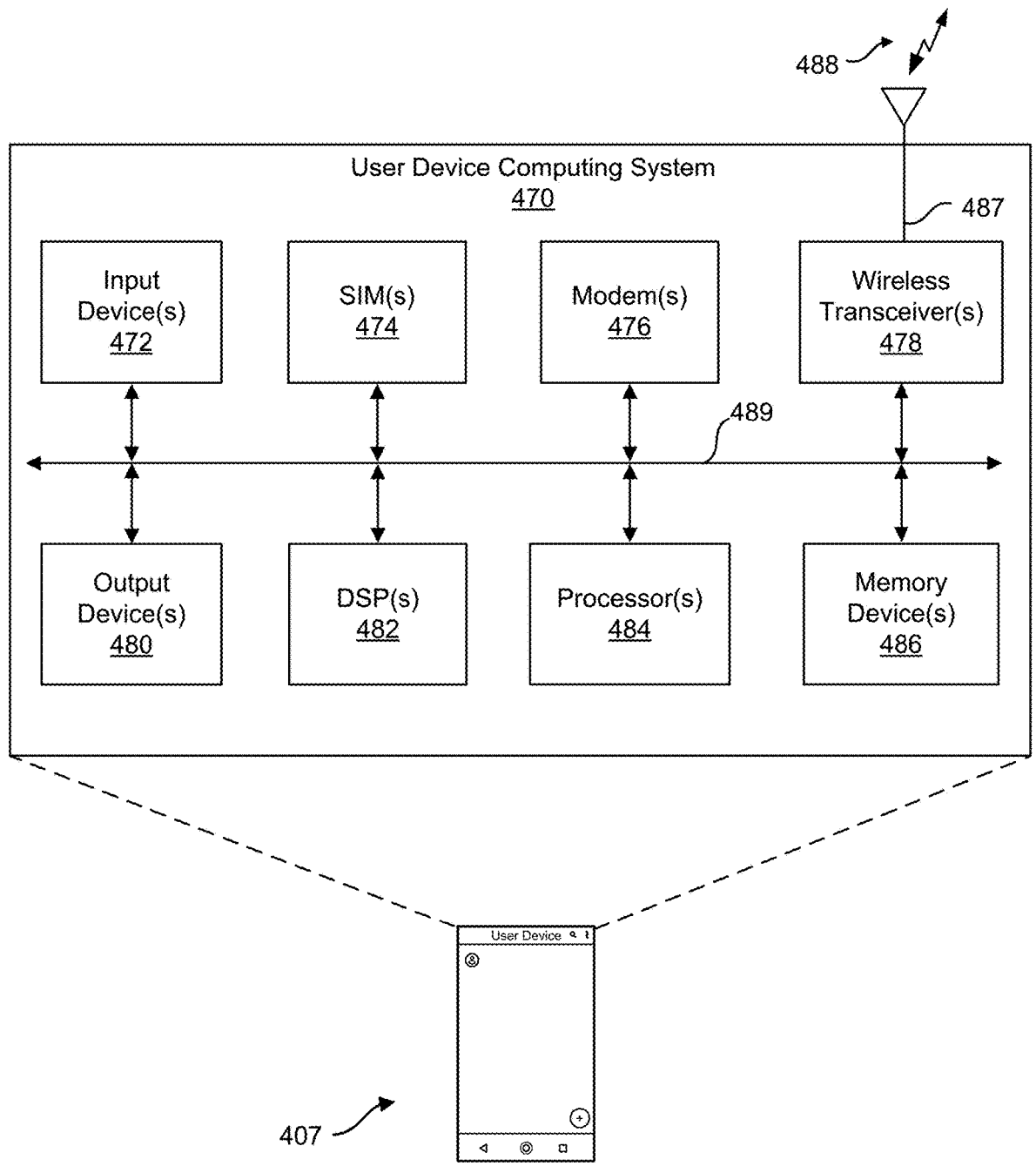
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMS 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 5:
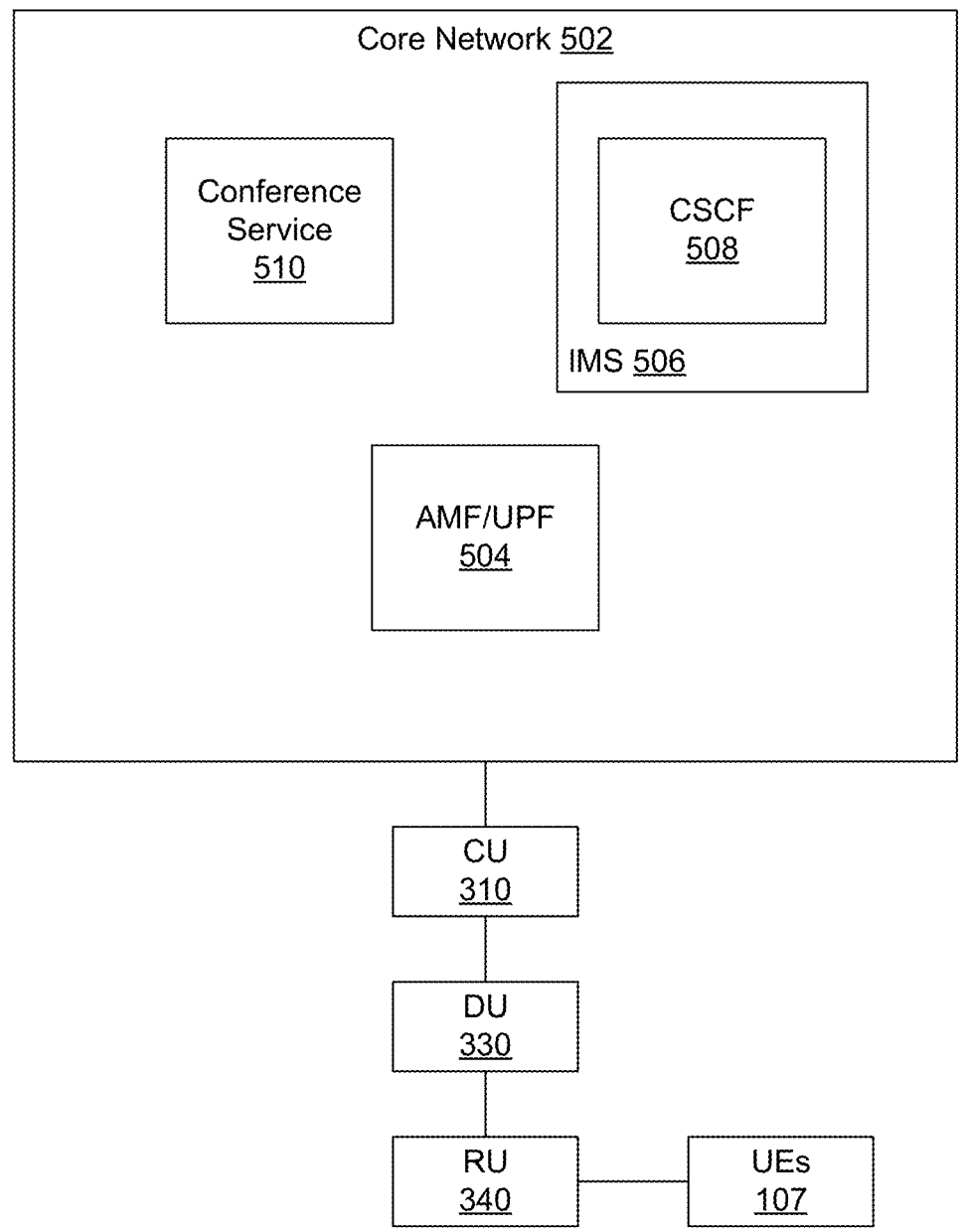
FIG. 5 is a block diagram illustrating an example multiuser calling system for a wireless communication system, in accordance with aspects of the present disclosure.

FIG. 5 is a block diagram illustrating an example 500 multiuser calling system for a wireless communication system, such as wireless communication system 100 of FIG. 1. The multiuser calling system may include a core network 502 (such as core network 170 of FIG. 1), which may be coupled to one or more UEs 104 via a CU 310, DU 330, and RU 340, as described in conjunction with FIG. 3. The core network 502, in this simplified example, may include an access and mobility management function/user plane function (AMF/UPF) 504, an IP multimedia subsystem (IMS) 506, and a conference service 508. The AMF/UPF 504 provides various access services, such as access to various access networks to the control plane, controls which UEs 104 can access the core network 502, forwards UE traffic among the access networks, enforces quality of service (QoS) on the uplink and downlink, etc. The IMS 506 may be a service layer framework that may be used to provide IP based multimedia services, such as voice services (e.g., voice over LTE (VoLTE), voice over 5G (Vo5G), etc.). In some cases, the IMS 506 may use, at least in part, a session initiation protocol (SIP) for access to voice services. The IMS 506 may include a call session control function (CSCF) 508 which process SIP services, such as authentication, user registration, call creation, packet forwarding, routing, and proxy services. SIP may be a signaling protocol that may be used for setting up, controlling, and ending communications services and/or sessions. These communication sessions may utilize voice, video, or other data, and the communication sessions may be set up as between users and a SIP-based service. In some cases, SIP may be used to establish a communication session and another protocol may be used to access and/or control services of the communication session. Of note, references to a user participating in a multiuser call may be understood to refer to the user device associated with the user participating in the multiuser call.

The conference service 510 may be a SIP-based service that provides voice and/or video conferencing services. Of note, it should be noted that core network 502 of example 500 is provide for illustration purposes and the core network 502 may include other services and components not shown in example 500. Additionally, components of the core network 502, such as the AMF/UPF 504, IMS 506, and conference service 510 may be services that can be implemented using any number of physical and/or virtual computing units, such as physical servers, virtual machines, containers, etc.

In some cases, a UE 107 may access services such as voice calling and multiuser calling services through the core network 502 by registering and/or authenticating with the AMF/UPF 504 and establishing a session with the IMS 506 via the AMF/UPF 504. After establishing the session with the IMS 506, the UE 107 may register with the IMS 506. Once registered, the UE may use SIP to establish a call with another user via the IMS 506 and CSCF 508.

Figure 6:
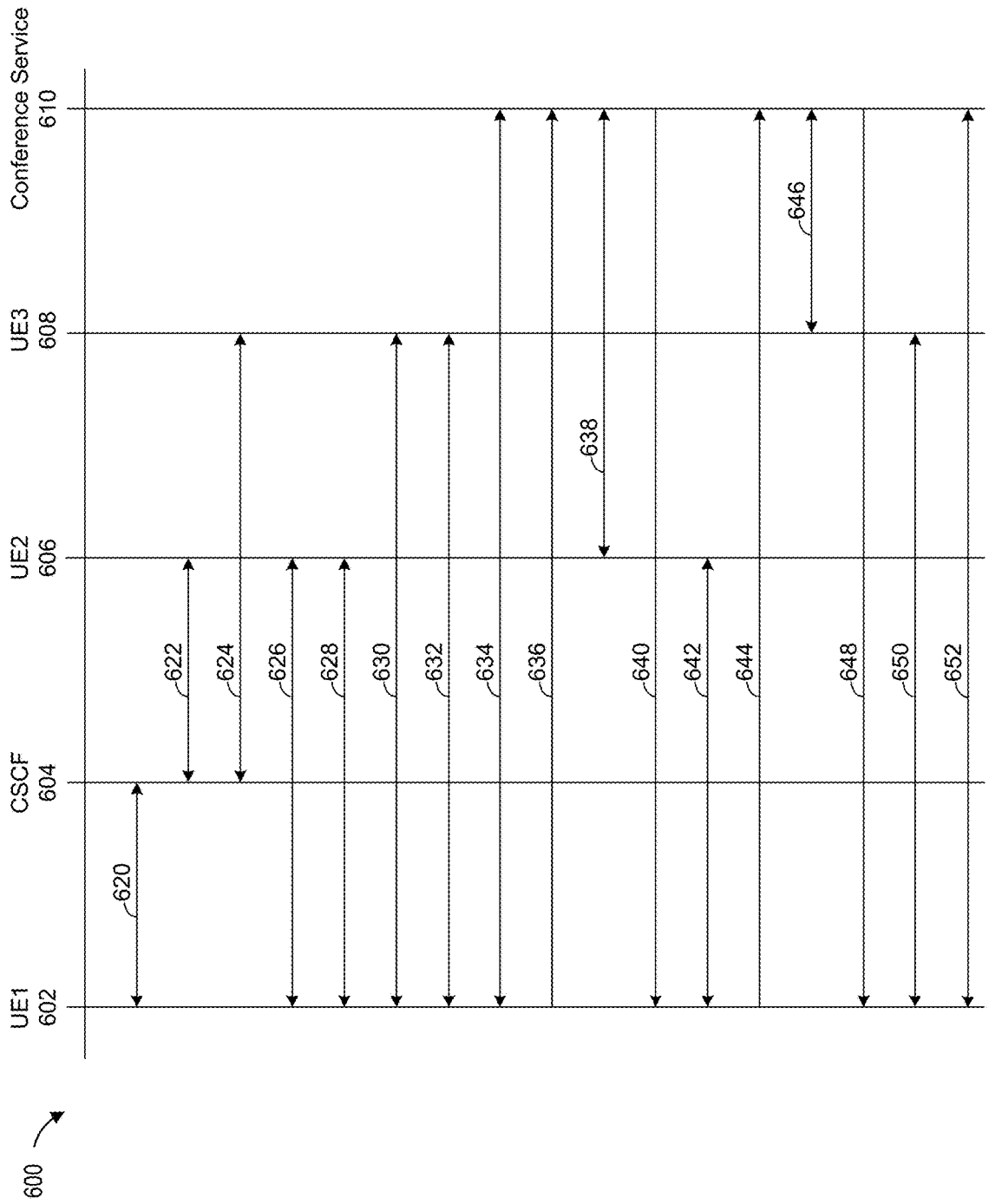
FIG. 6 is a signal flow diagram illustrating establishment of a multiuser call, in accordance with aspects of the present disclosure.

FIG. 6 is a signal flow diagram 600 illustrating establishment of a multiuser call, in accordance with aspects of the present disclosure. Signal flow diagram 600 is a high-level overview of signals between a first UE1 602, a CSCF 604, a second UE2 606, a third UE3 608, and a conference service 610. Of note, certain details of the multiuser call establishment procedure, such as AMF/UPF procedures, acknowledgments, negotiations, etc., have been omitted from signal flow diagram 600 for clarity.

Initially, the first UE1 602 may signal 620 the CSCF 604 to register with the CSCF 604. Similarly, the second UE2 606 may signal 622 the CSCF 604 to register with the CSCF 604 and the third UE3 608 may also signal 624 the CSCF 604 to register with the CSCF 604. The first UE1 602 may establish a first voice call with the second UE2 606 by signaling 626, via the CSCF 604, the second UE2 606. To set up a multiuser call, the first UE1 602 may signal 628, via the CSCF 604, the second UE2 606 to place the first voice call with the second UE2 606 on hold. The first UE1 602 may then signal 630, via the CSCF 604, the third UE3 608 to establish a second voice call with the third UE3 608.

In some cases, to merge the first voice call and the second voice call into a single multiuser call, the first UE1 602 may signal 632, via the CSCF 604, the third UE2 608 to place the second voice call with the third UE2 608 on hold and signal 634 the conference service 610 to establish a session with the conference service 610. In some cases, after the session with the conference service 610 is established, the first UE1 602 may signal 636, via the CSCF 604, the conference service 610 to refer the other UEs to establish a multiuser call with. For example, the first UE1 602 may refer the second UE2 606 to the conference service 610. The conference service 610 may signal 638, via the CSCF 604, the second UE2 606 and join the second UE2 606 to the multiuser call by establishing a call with the second UE 606. The conference service 610 may signal 640, via the CSCF 604, the first UE1 602 indicating that the second UE 606 has joined the multiuser call session. The first UE1 602 may then signal 642, via the CSCF 604, the second UE2 606 to end the first voice call.

The first UE1 602 may then signal 644, via the CSCF 604, the conference service 610 to refer the third UE8 608. The conference service 610 may signal 646 the third UE3 608 and join the third UE3 608 to the multiuser call by establishing a call with the second UE 606. The conference service 610 may signal 648 the first UE1 602 indicating that the third UE 608 has joined the multiuser call session. The first UE 602 may then signal 650 the third UE3 608 to end the second voice call. The first UE 602 may then signal 652 the conference service 610 and join the multiuser call session.

In some cases, the conference service 610 may record the multiuser call. For example, a UE, such as the first UE1 602, may indicate (e.g., send a message) to the conference service 610 to record the multiuser call. As indicated above, the conference service 610 establishes a call with each of the UEs on the multiuser call and may record the multiuser call based on a request to record the call. This recording may include audio information from all of the UEs participating in the multiuser call (assuming the UEs are not on mute). In other cases, a particular UE, such as the first UE2 606, may record the multiuser call based on a request to record the call. For example, the UE may receive, in some cases an audio stream for the other UEs along with meta-data labelling portions of the audio stream, or multiple audio streams that may be selectively recorded.

In some cases, it may be useful to record certain users on a multiuser call, but not record other users on the multiuser call. For example, it may be useful to not record certain users on a multiuser call if those users do not want to be recorded, are experiencing noisy background noises, to save space for the recording, etc.

Figure 7:
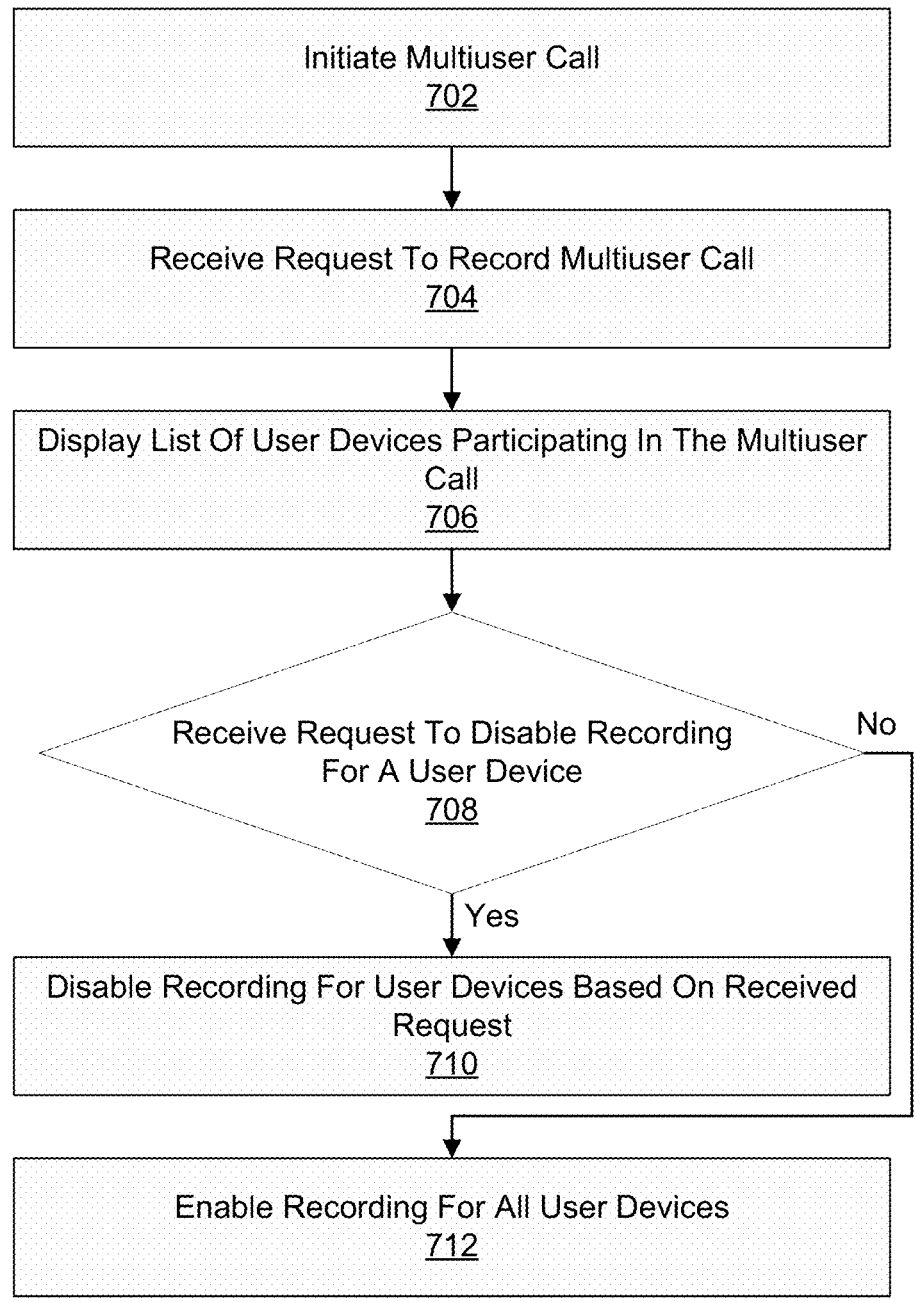
FIG. 7 is a flow diagram illustrating an example of a process for selectively recording users of a multiuser call, in accordance with aspects of the present disclosure.

FIG. 7 is a flow diagram 700 illustrating an example of a process for selectively recording users of a multiuser call, in accordance with aspects of the present disclosure. Initially, at block 702, a multiuser call may be initiated among a set of user devices. For example, a set of user devices, such as UEs, may initiate, or be participating in, a multiuser call. At block 704, a request may be received to record the multiuser call. For example, a first UE may receive a request to record the multiuser call. In some cases, a request to record the multiuser call may be received from a user. For example, the user may interact with a user interface (UI) for controlling the multiuser call and select a UI element to initiate recording the multiuser call.

At block 706, a list of user devices participating in the multiuser call may be displayed. The list of user devices may be displayed in response to a request. For example, in some cases, the user may select a UI element to display the list of user devices. In other cases, the list of user devices may be displayed automatically when recording of a multiuser call is initiated and/or when recording of a multiuser call. In some cases, the UE may generate the list of user devices based on data from the multiuser call. For example, a list of users may be generated using caller-ID information. As another example, the multiuser call may include data or metadata indicating the other participants (e.g., user devices participating) in the multiuser call. This data/metadata may used to generate the list of users. At block 708, if no request to disable (or enable) recording for specific user devices is received, execution may proceed to block 712 where recording is enabled for all user devices participating in the multiuser call.

Generally, any component with access to the audio streams from the user devices participating in the multiuser call may record the multiuser call and the component performing the recording of the multiuser call may vary depending on implementation of the multiuser calling system. In some cases, the conference service, such as conference service 610 of FIG. 6, may record the multiuser call. For example, a UE may indicate (e.g., send a message) to the conference service 610 to record the multiuser call. As indicated above, the conference service 610 establishes a call with each of the UEs on the multiuser call and may record the multiuser call based on a request to record the call. This recording may include audio information from all of the UEs participating in the multiuser call (assuming the UEs are not on mute). In other cases, a user device participating in the multiuser call may record the multiuser call based on the request to record the call. For example, a UE may receive, in some cases, an audio stream for the other UEs along with meta-data labelling portions of the audio stream as coming from certain UEs, or the UE may receive multiple audio streams and the UE may selectively record certain audio streams of the multiple audio streams.

At block 708, if a request to disable (or enable) recording for a user device, of the set of user devices participating in the multiuser call, is received, execution may proceed to block 710. For example, if a user device, of the list of user devices is selected, an indication to disable recording for that user device (or an indication to enable recording for the other user devices) may be generated and sent to the component performing the recording of the multiuser call. As another example, if a user device, of the list of user devices is selected, an indication to enable recording for that user device (or an indication to disable recording for the other user devices) may be generated and sent to the component performing the recording of the multiuser call. For example, if the recording is performed by the user device, the UI that receives the request to disable recording may transmit an indication to a recording engine to disable recording for a user device. As another example, if the indication to disable recording is received from a user at a first device and the recording is performed by a second device, such as a server or other user device, a request to disable recording may be transmitted from the first device to the second device. At block 710, recording of audio from the identified user devices is disabled (or enabled) based on the received request.

In some cases, selectively recording certain user devices from the multiuser call may be performed based on two or more audio streams and an indication of the user device associated with an audio stream. For example, as indicated above, a conference service, such as conference service 610 of FIG. 6, establishes a call with each of the UEs on the multiuser call and thus has access to an audio stream (e.g., the call) associated with the UEs on the multiuser call and can match UEs with a respective audio stream. In such cases, the conference service can selectively disable recording of a UE for a multiuser call by not recording the audio stream associated with the UE. Cases where a user device recording the multiuser call has access to audio streams associated with other user device may be similar as the user device can match user device with a respective audio stream and selectively disable recording of a user device for a multiuser call by not recording the audio stream associated with the user device. In some cases, a user device may selectively disable recording of a user device in a multiuser call in cooperation with a server device, such as a conference service. For example, the service device may merge audio streams associated with user devices which may be recorded and/or merge audio streams associated with user devices which may not be recorded and transmit these audio streams the user device. The user device may then record and/or not record certain audio streams.

In some cases, selectively recording certain user devices from the multiuser call may be performed based on an audio stream and an indication of the user device associated with sounds on the audio stream. For example, an audio stream may include an indication of which user (e.g., user device associated with a user) is currently speaking in the audio stream and this indication may be used to determine whether to record the corresponding portion of the audio stream. In other cases, audio fingerprinting may be used, for example by a recording device, to determine which user (e.g., user device) is currently speaking and determine whether to record the corresponding portion of the audio stream.

It may be noted that while the examples presented herein primarily address voice or audio data, the same technique and concepts may be applied equally to video data for multiuser video conferencing.

Figure 8:
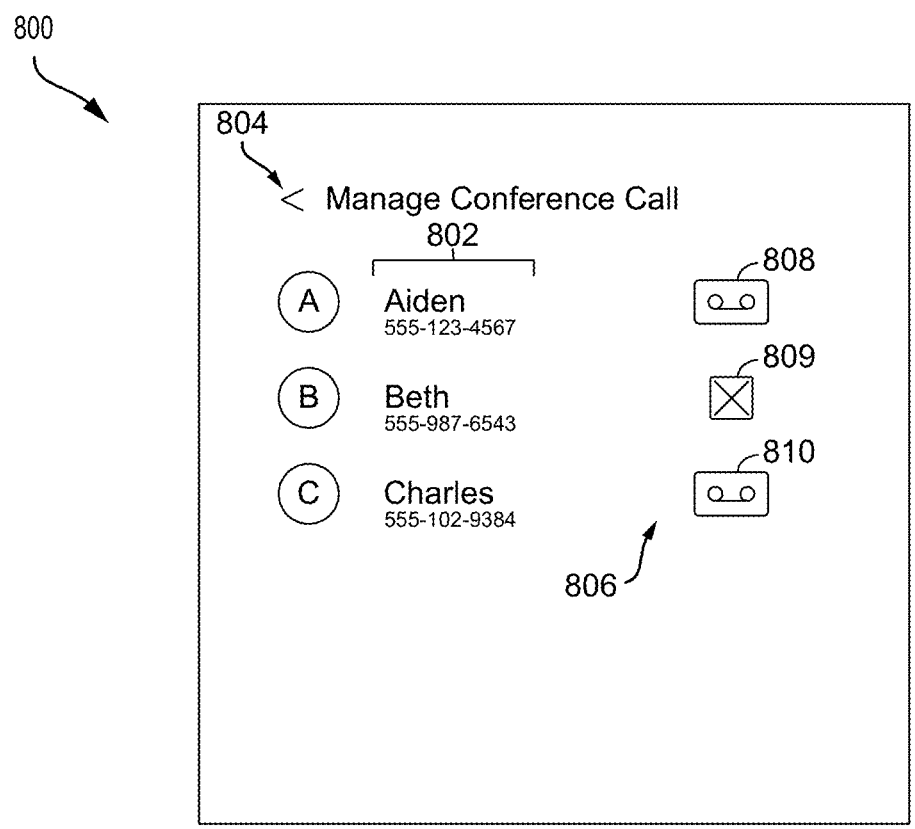
FIG. 8 is an example user interface for selectively enabling or disabling recording of users in a multiuser call, in accordance with aspects of the present disclosure.

FIG. 8 is an example UI 800 for selectively enabling or disabling recording of users in a multiuser call, in accordance with aspects of the present disclosure. In some cases, UI 800 may include a listing of users 802, associated with a respective user device, participating in a multiuser call. As discussed above with respect to block 706 of FIG. 7, UI 800, in some cases, may be displayed in response to a request. For example, a user may select a UI element on a multiuser call display view (not shown) to display a listing of users 802 view. The user may select UI element 804 on the listing of users 802 view to return to the multiuser call display view.

In some cases, UI 800 may include UI elements 806 for enabling or disabling recording for specific user devices participating in the multiuser call. The UI elements 806 may be any known UI element, such as a toggle switch, checkbox, dropdown list, and the like. In this example, UI elements 806 is shown as a toggle switch that may change icons when toggled to indicate whether a user device in the multiuser call is to be recorded. In one example, a user may select an enable record option (e.g., enable record option 808 or enable record option 810) to enable recording for a particular user and associated user device. In another example, the user may select a disable record option (e.g., disable record option 809) to disable recording for a particular user and associated user device. Such a UI 800 can allow selective recording of particular users (and corresponding user devices) during a multiuser call.

Figure 9:
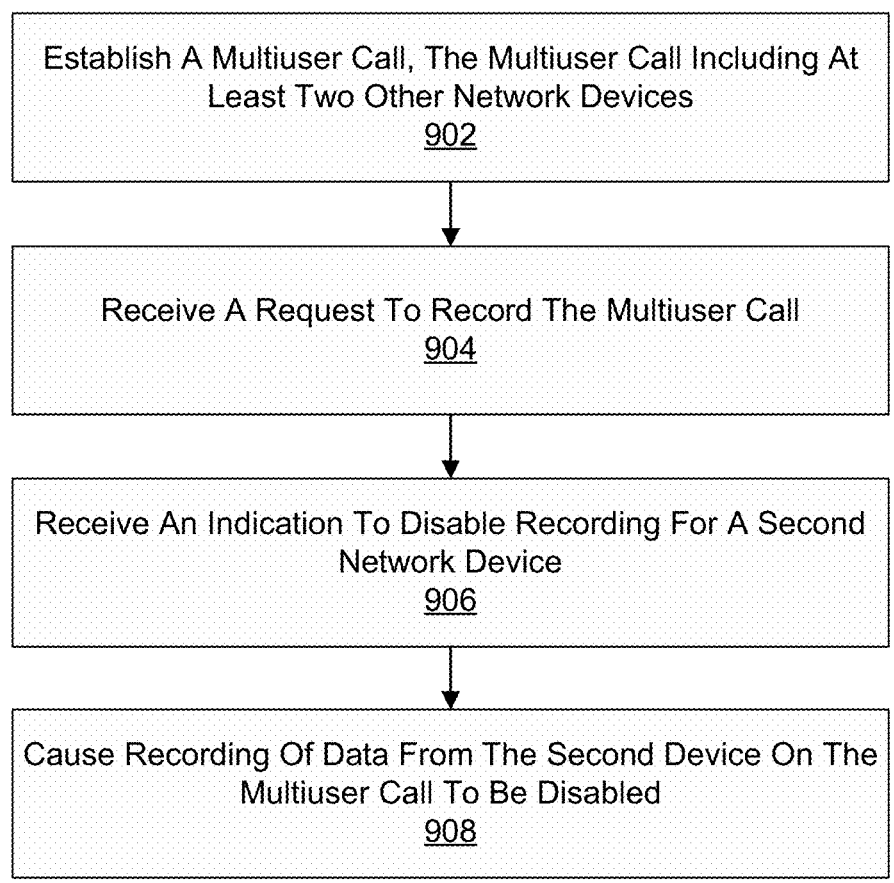
FIG. 9 is a flow diagram for a process for multiuser communications, in accordance with aspects of the present disclosure.

FIG. 9 is a flow diagram for a process 900 for multiuser communications, in accordance with aspects of the present disclosure. The process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 900 may be implemented as software components that are executed and run on one or more processors.

At block 902, the computing device (or component thereof) may establish a multiuser call, the multiuser call including at least two other network devices. At block 904, the computing device (or component thereof) may receive a request to record the multiuser call.

At block 906, the computing device (or component thereof) may receive an indication to disable recording for a second network device. In some cases, the indication to disable recording is received based on user input received via a user interface. In some cases, the computing device (or component thereof) may obtain a list of network devices associated with the multiuser call; and cause the list of network devices to be displayed via a display. In some cases, the indication to disable recording is received based on user input indicating a selection of a network device from the list of network devices.

At block 908, the computing device (or component thereof) may cause recording of data from the second network device on the multiuser call to be disabled. In some cases, the computing device (or component thereof) may disable recording of the second network device on the multiuser call. In some cases, the computing device (or component thereof) may receive at least one of audio or video data from the at least two other network devices along with an indication of which network device the received at least one of the audio or video data is associated with. In some cases, to disable recording for the second network device, the computing device (or component thereof) may not store audio data or video data received from the second network device. In some cases, to cause recording of data from the second network device to be disabled, the computing device (or component thereof) may transmit a request to disable the recording of data from the second network device to a network device recording the multiuser call. In some cases, the computing device (or component thereof) may conduct the multiuser call including data from the second network device.

In some examples, the processes described herein (e.g., process 900 and/or other process described herein) may be performed by a computing device or apparatus (e.g., a UE or a base station). In another example, the process 900 may be performed by either the UE 104 or UE 190 of FIG. 1. In another example, the process 900 may be performed by a computing device with the computing system 1000 shown in FIG. 10.

Figure 10:
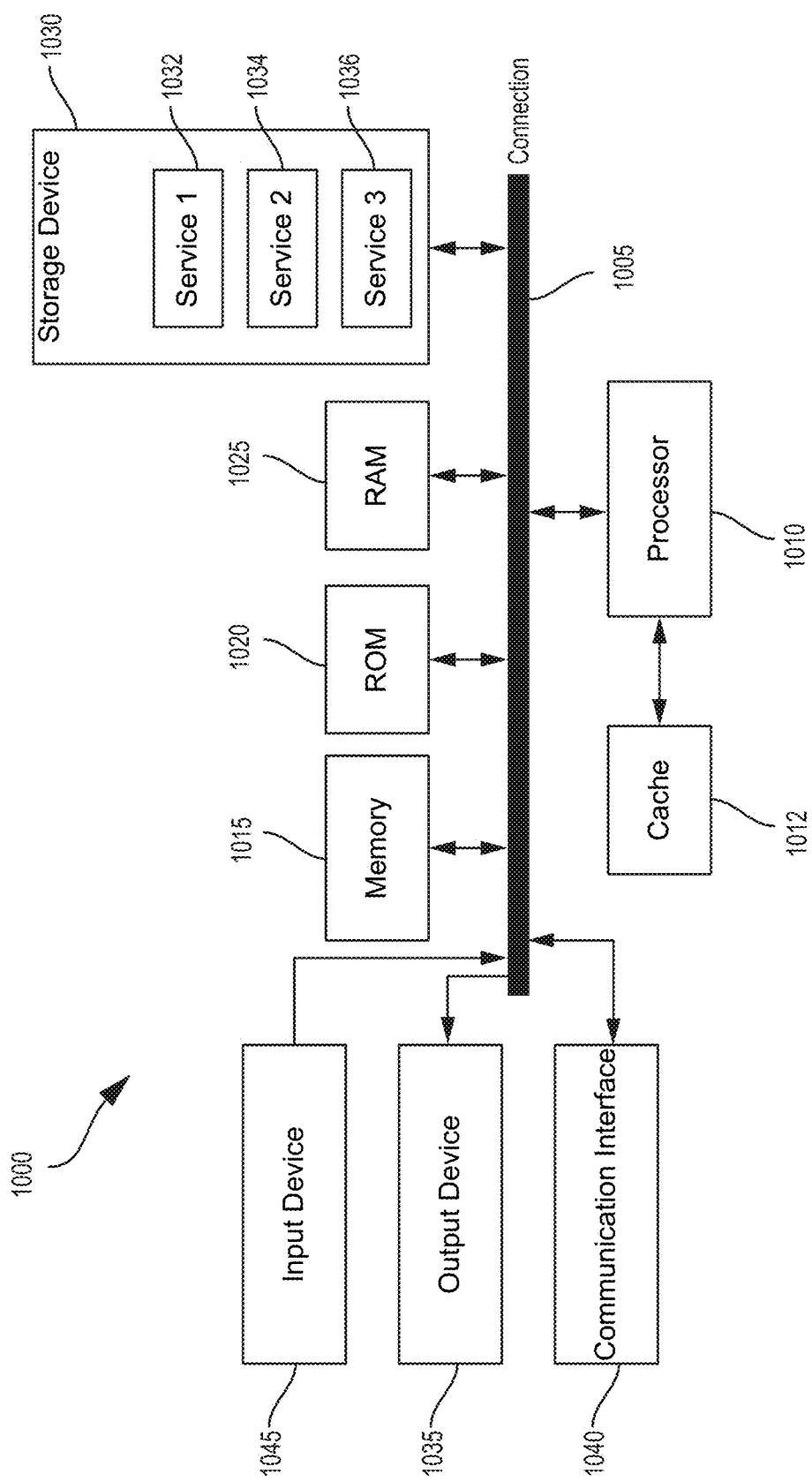
FIG. 10. is a diagram illustrating an example of a computing system, according to aspects of the present disclosure.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some embodiments, computing system 1000 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some embodiments, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A first network device for multiuser communications, comprising: at least one memory comprising instructions; and at least one processor coupled to the at least one memory and configured to: establish a multiuser call, the multiuser call including at least two other network devices; receive a request to record the multiuser call; receive an indication to disable recording for a second network device; and cause recording of data from the second network device on the multiuser call to be disabled.

Aspect 2. The first network device of aspect 1, wherein the at least one processor is further configured to disable recording of the second network device on the multiuser call.

Aspect 3. The first network device of aspect 2, wherein the at least one processor is further configured to receive at least one of audio or video data from the at least two other network devices along with an indication of which network device the received at least one of the audio or video data is associated with.

Aspect 4. The first network device of aspect 3, wherein, to disable recording for the second network device, the at least one processor is further configured to not store audio data or video data received from the second network device.

Aspect 5. The first network device of any of aspects 1-4, wherein, to cause recording of data from the second network device to be disabled, the at least one processor is further configured to transmit a request to disable the recording of data from the second network device to a network device recording the multiuser call.

Aspect 6. The first network device of any of aspects 1-5, wherein the indication to disable recording is received based on user input received via a user interface.

Aspect 7. The first network device of aspect 6, wherein the at least one processor is further configured to: obtain a list of network devices associated with the multiuser call; and cause the list of network devices to be displayed via a display.

Aspect 8. The first network device of aspect 7, wherein the indication to disable recording is received based on user input indicating a selection of a network device from the list of network devices.

Aspect 9. The first network device of any of aspects 1-8, wherein the at least one processor is further configured to conduct the multiuser call including data from the second network device.

Aspect 10. A method for multiuser communications, comprising: establishing a multiuser call, the multiuser call including at least two other network devices; receiving a request to record the multiuser call; receiving an indication to disable recording for a second network device; and causing recording of data from the second network device on the multiuser call to be disabled.

Aspect 11. The method of aspect 10, further comprising disabling recording of the second network device on the multiuser call.

Aspect 12. The method of aspect 11, further comprising receiving at least one of audio or video data from the at least two other network devices along with an indication of which network device the received at least one of the audio or video data is associated with.

Aspect 13. The method of aspect 12, wherein disabling recording for the second network device comprising not storing audio data or video data received from the second network device.

Aspect 14. The method of any of aspects 10-13, wherein causing recording of data from the second network device to be disabled comprises transmitting a request to disable the recording of data from the second network device to a network device recording the multiuser call.

Aspect 15. The method of any of aspects 10-14, wherein the indication to disable recording is received based on user input received via a user interface.

Aspect 16. The method of aspect 15, further comprising: obtaining a list of network devices associated with the multiuser call; and causing the list of network devices to be displayed via a display.

Aspect 17. The method of aspect 16, wherein the indication to disable recording is received based on user input indicating a selection of a network device from the list of network devices.

Aspect 18. The method of any of aspects 10-17, further comprising conducting the multiuser call including data from the second network device.

Aspect 19. A non-transitory computer-readable medium having stored thereon instructions that, when executed by at least one processor, cause the at least one processor to: establish a multiuser call, the multiuser call including at least two other network devices; receive a request to record the multiuser call; receive an indication to disable recording for a second network device; and cause recording of data from the second network device on the multiuser call to be disabled.

Aspect 20. The non-transitory computer-readable medium of aspect 19, wherein instructions further cause the at least one processor to disable recording of the second network device on the multiuser call.

Aspect 21. The non-transitory computer-readable medium of aspect 20, wherein the instructions further cause the at least one processor to receive at least one of audio or video data from the at least two other network devices along with an indication of which network device the received at least one of the audio or video data is associated with.

Aspect 22. The non-transitory computer-readable medium of aspect 21, wherein, to disable recording for the second network device, the instructions cause the at least one processor to not store audio data or video data received from the second network device.

Aspect 23. The non-transitory computer-readable medium of any of aspects 19-23, wherein, to cause recording of data from the second network device to be disabled, the instructions cause the at least one processor to transmit a request to disable the recording of data from the second network device to a network device recording the multiuser call.

Aspect 24. The non-transitory computer-readable medium of any of aspects 19-23, wherein the indication to disable recording is received based on user input received via a user interface.

Aspect 25. The non-transitory computer-readable medium of aspect 24, wherein the instructions further cause the at least one processor to: obtain a list of network devices associated with the multiuser call; and cause the list of network devices to be displayed via a display.

Aspect 26. The non-transitory computer-readable medium of aspect 25, wherein the indication to disable recording is received based on user input indicating a selection of a network device from the list of network devices.

Aspect 27. The non-transitory computer-readable medium of any of aspects 19-23, wherein the instructions further cause the at least one processor to conduct the multiuser call including data from the second network device.

Aspect 28. An apparatus for multiuser communications, comprising: means for establishing a multiuser call, the multiuser call including at least two other network devices; means for receiving a request to record the multiuser call; means for receiving an indication to disable recording for a second network device; and means for causing recording of data from the second network device on the multiuser call to be disabled.

Aspect 29. The apparatus of aspect 28, further comprising means for disabling recording of the second network device on the multiuser call.

Aspect 30. The apparatus of aspect 29, further comprising means for receiving at least one of audio or video data from the at least two other network devices along with an indication of which network device the received at least one of the audio or video data is associated with.

Aspect 31. An apparatus comprising means for performing a method according to any of Aspects 10 to 18.

What is claimed is:

1. A first network device for multiuser communications, comprising:
at least one memory comprising instructions; and
at least one processor coupled to the at least one memory and configured to:
establish a multiuser call, the multiuser call including at least two other network devices;
receive a request to record the multiuser call;
receive an indication to disable recording, by the first network device based on received a user input, for a second network device of the at least two other network devices;
cause recording of data from the second network device on the multiuser call to be disabled; and
continue recording of data from a third network device of the at least two other network devices on the multiuser call.

2. The first network device of claim 1, wherein the at least one processor is further configured to disable recording of the second network device on the multiuser call.

3. The first network device of claim 2, wherein the at least one processor is further configured to receive at least one of audio or video data from the at least two other network devices along with an indication of which network device the received at least one of the audio or video data is associated with.

4. The first network device of claim 3, wherein, to disable recording for the second network device, the at least one processor is further configured to not store audio data or video data received from the second network device.

5. The first network device of claim 1, wherein, to cause recording of data from the second network device to be disabled, the at least one processor is further configured to transmit a request to disable the recording of data from the second network device to a network device recording the multiuser call.

6. The first network device of claim 1, wherein the indication to disable recording is received based on user input received via a user interface.

7. The first network device of claim 6, wherein the at least one processor is further configured to:
obtain a list of network devices associated with the multiuser call; and
cause the list of network devices to be displayed via a display.

8. The first network device of claim 7, wherein the indication to disable recording is received based on user input indicating a selection of a network device from the list of network devices.

9. The first network device of claim 1, wherein the at least one processor is further configured to conduct the multiuser call including data from the second network device.

10. A method for multiuser communications by a first network device, comprising:
establishing a multiuser call, the multiuser call including at least two other network devices;
receiving a request to record the multiuser call;
receiving an indication to disable recording, by the first network device based on a received user input, for a second network device of the at least two other network devices;
causing recording of data from the second network device on the multiuser call to be disabled; and
continuing recording of data from a third network device of the at least two other network devices on the multiuser call.

11. The method of claim 10, further comprising disabling recording of the second network device on the multiuser call.

12. The method of claim 11, further comprising receiving at least one of audio or video data from the at least two other network devices along with an indication of which network device the received at least one of the audio or video data is associated with.

13. The method of claim 12, wherein disabling recording for the second network device comprising not storing audio data or video data received from the second network device.

14. The method of claim 10, wherein causing recording of data from the second network device to be disabled comprises transmitting a request to disable the recording of data from the second network device to a network device recording the multiuser call.

15. The method of claim 10, wherein the indication to disable recording is received based on user input received via a user interface.

16. The method of claim 15, further comprising:
obtaining a list of network devices associated with the multiuser call; and
causing the list of network devices to be displayed via a display.

17. The method of claim 16, wherein the indication to disable recording is received based on user input indicating a selection of a network device from the list of network devices.

18. The method of claim 10, further comprising conducting the multiuser call including data from the second network device.

19. A non-transitory computer-readable medium having stored thereon instructions that, when executed by at least one processor, cause the at least one processor to:
establish a multiuser call, the multiuser call including at least two other three network devices;
receive a request to record the multiuser call;
receive an indication to disable recording, by a first network device, of the at least three network devices, based on received a user input, for a second network device of the at least three network devices;
cause recording of data from the second network device on the multiuser call to be disabled; and
continue recording of data from a third network device of the at least three network devices on the multiuser call.

20. The non-transitory computer-readable medium of claim 19, wherein instructions further cause the at least one processor to disable recording of the second network device on the multiuser call.

21. The non-transitory computer-readable medium of claim 20, wherein the instructions further cause the at least one processor to receive at least one of audio or video data from the at least three network devices along with an indication of which network device the received at least one of the audio or video data is associated with.

22. The non-transitory computer-readable medium of claim 21, wherein, to disable recording for the second network device, the instructions cause the at least one processor to not store audio data or video data received from the second network device.

23. The non-transitory computer-readable medium of claim 19, wherein, to cause recording of data from the second network device to be disabled, the instructions cause the at least one processor to transmit a request to disable the recording of data from the second network device to a network device recording the multiuser call.

24. The non-transitory computer-readable medium of claim 19, wherein the indication to disable recording is received based on user input received via a user interface.

25. The non-transitory computer-readable medium of claim 24, wherein the instructions further cause the at least one processor to:
obtain a list of network devices associated with the multiuser call; and
cause the list of network devices to be displayed via a display.

26. The non-transitory computer-readable medium of claim 25, wherein the indication to disable recording is received based on user input indicating a selection of a network device from the list of network devices.

27. The non-transitory computer-readable medium of claim 19, wherein the instructions further cause the at least one processor to conduct the multiuser call including data from the second network device.

28. A first network device for multiuser communications, comprising:
   means for establishing a multiuser call, the multiuser call including at least two other network devices;
   means for receiving a request to record the multiuser call;
   means for receiving an indication to disable recording, by the first network device based on received a user input, for a second network device of the at least two other network devices;
   means for causing recording of data from the second network device on the multiuser call to be disabled; and
   means for continuing recording of data from a third network device of the at least two other network devices on the multiuser call.

29. The first network device of claim 28, further comprising means for disabling recording of the second network device on the multiuser call.

30. The first network device of claim 29, further comprising means for receiving at least one of audio or video data from the at least two other network devices along with an indication of which network device the received at least one of the audio or video data is associated with.

* * * * *